US012673323B2

(12) United States Patent
Liu et al.

(10) Patent No.: US 12,673,323 B2
(45) Date of Patent: Jul. 7, 2026

(54) DETECTION CHIP, AND FABRICATION METHOD AND SAMPLE INTRODUCTION METHOD THEREOF

(71) Applicants: Beijing BOE Technology Development Co., Ltd., Beijing (CN); BOE TECHNOLOGY GROUP CO., LTD., Beijing (CN)

(72) Inventors: Zhukai Liu, Beijing (CN); Ding Ding, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1106 days.

(21) Appl. No.: 17/772,647

(22) PCT Filed: May 31, 2021

(86) PCT No.: PCT/CN2021/097193
§ 371 (c)(1),
(2) Date: Apr. 28, 2022

(87) PCT Pub. No.: WO2022/252004
PCT Pub. Date: Aug. 12, 2022

(65) Prior Publication Data
US 2024/0165619 A1 May 23, 2024

(51) Int. Cl.
*G01N 21/64* (2006.01)
*B01L 3/00* (2006.01)
*B01L 7/00* (2006.01)

(52) U.S. Cl.
CPC ........... *B01L 3/502769* (2013.01); *B01L 7/52* (2013.01); *B01L 2200/0621* (2013.01);
(Continued)

(58) Field of Classification Search
None
See application file for complete search history.

(56) References Cited

U.S. PATENT DOCUMENTS

2011/0217697 A1* 9/2011 Rothberg ........... G01N 27/4148 435/6.1
2018/0214873 A1* 8/2018 DeVoe ................... C12Q 1/686
(Continued)

FOREIGN PATENT DOCUMENTS

CN 101206175 A 6/2008
CN 105802843 A * 7/2016 ........... C12Q 1/6851
(Continued)

*Primary Examiner* — Maris R Kessel
*Assistant Examiner* — Madison T. Herbert
(74) *Attorney, Agent, or Firm* — HOUTTEMAN LAW LLC

(57) ABSTRACT

The present disclosure provide a detection chip having at least one functional region, the functional region including: a reaction region and a non-reaction region surrounding the reaction region. The detection chip includes: a first substrate and a second substrate opposite to each other. In the reaction region, a side of the first substrate facing the second substrate is provided with reaction grooves arranged in an array along a first direction and a second direction; first communication grooves each between two reaction grooves adjacent in the first direction, and connected with the two reaction grooves; and second communication grooves each between two first communication grooves adjacent in the second direction, and connected with the two adjacent first communication grooves, and the first direction intersects the second direction. The embodiments of the present disclosure further provide a fabrication method and a sample introduction method of the detection chip.

17 Claims, 7 Drawing Sheets

(52) U.S. Cl.
CPC .................. *B01L 2200/0642* (2013.01); *B01L 2300/0874* (2013.01); *B01L 2300/1883* (2013.01)

(56) References Cited

U.S. PATENT DOCUMENTS

| | | | | |
|---|---|---|---|---|
| 2018/0250672 | A1* | 9/2018 | Jamshidi | C12Q 1/6806 |
| 2019/0168221 | A1 | 6/2019 | Sollier et al. | |

FOREIGN PATENT DOCUMENTS

| | | | | | |
|---|---|---|---|---|---|
| CN | 106745245 | A | * | 5/2017 | B01L 7/52 |
| CN | 106754245 | A | * | 5/2017 | B01L 7/52 |
| CN | 106755420 | A | * | 5/2017 | C12Q 1/6851 |
| CN | 109894163 | A | | 6/2019 | |
| CN | 209727963 | U | | 12/2019 | |
| CN | 112206839 | A | | 1/2021 | |
| EP | 3763438 | A1 | * | 1/2021 | B01L 3/502753 |
| WO | WO-2020073867 | A1 | * | 4/2020 | C12Q 1/6869 |

* cited by examiner

DETECTION CHIP, AND FABRICATION METHOD AND SAMPLE INTRODUCTION METHOD THEREOF

CROSS-REFERENCE TO RELATED APPLICATION

This is a National Phase Application filed under 35 U.S.C. 371 as a national stage of PCT/CN2021/097193, filed on May 31, 2021.

TECHNICAL FIELD

Embodiments of the present disclosure relate to a detection chip, and a fabrication method and a sample introduction method thereof.

BACKGROUND

The digital polymerase chain reaction (DPCR for short) is a third generation of quantitative analysis technique for nucleic acid molecules, which is rapidly developed in recent years. The principle of DPCR is that a sample is uniformly distributed in tens of thousands of different reaction units, each reaction unit at least contains a copied target DNA template, then PCR amplification is respectively carried out in each reaction unit, and the fluorescence signals of the reaction units are statistically analyzed after the amplification is finished. This technology is independent of a standard curve, is less influenced by amplification efficiency, has good accuracy and reproducibility, can realize absolute quantitative analysis, and shows great technical advantages in the research fields of nucleic acid detection, identification and the like. Compared with the traditional real-time fluorescent quantitative PCR, this technology is particularly suitable for the fields of copy number variation, rare mutation detection and typing, NGS verification, expression and analysis for single cell and the like.

At present, the digital PCR is mainly implemented in an array form or a liquid drop form. The digital PCR detection chip in an array form has more uniform volume of micro reaction, higher stability and smaller influence among systems, and is more favorable for obtaining an analysis result with high accuracy, compared with that in the liquid drop form. Meanwhile, the processing of microarray is relatively complex, and the sample introduction process of the sample solution on the detection chip, that is, the process of the sample solution entering each micro reaction cavity, has low efficiency, the whole cavity cannot be successfully filled with the sample solution, so that the distribution of the sample solution in the micro reaction cavities is not uniform, which directly has influence on the amplification efficiency and result interpretation, and thus limits the application of the digital PCR detection chip in the array form.

SUMMARY

In a first aspect, an embodiment of the present disclosure provides a detection chip having at least one functional region, each functional region including: a reaction region and a non-reaction region surrounding the reaction region, wherein the detection chip includes: a first substrate and a second substrate opposite to each other, a plurality of reaction grooves arranged in an array along a first direction and a second direction, on a side of the first substrate facing the second substrate in the reaction region; first communication grooves, each of which is between two reaction grooves adjacent in the first direction and connected with the two reaction grooves, and extends along the first direction; and second communication grooves, each of which is between two first communication grooves adjacent in the second direction and connected with the two first communication grooves, and extends along the second direction, wherein the first direction intersects the second direction.

In some embodiments, a width of the first communication groove is greater than a width of the second communication groove.

In some embodiments, a depth of the reaction groove is greater than or equal to a depth of the second communication groove.

In some embodiments, the first communication groove includes: a first portion, a second portion and a third portion sequentially connected along the first direction, the first portion and the third portion being respectively connected with two adjacent reaction grooves, and the second portion being connected with the second communication groove; a depth of the first portion and a depth of the third portion are both greater than or equal to the depth of the second communication groove; and a depth of the second portion is equal to the depth of the second communication groove.

In some embodiments, the detection chip further includes a first liquid inlet and a first liquid outlet penetrating the second substrate and in the non-reaction region, wherein the reaction grooves and the first communication grooves alternately arranged in the first direction constitute a first communication channel, and two ends of the first communication channel are respectively communicated with the first liquid inlet and the first liquid outlet.

In some embodiments, the first liquid inlet and the first liquid outlet are respectively on opposite sides of the reaction region in the first direction.

In some embodiments, a line connecting a center of the first liquid inlet and a center of the first liquid outlet extends in the first direction and passes through a center of the reaction region.

In some embodiments, the detection chip further includes a first inlet connection groove and a first outlet connection groove corresponding to the first communication channel on the side of the first substrate facing the second substrate, wherein one end of the first inlet connection groove is connected with one end of a corresponding first communication channel, and the other end of the first inlet connection groove extends to the non-reaction region and is connected with the first liquid inlet; and one end of the first outlet connection groove is connected with the other end of the corresponding first communication channel, and the other end of the first outlet connection groove extends to the non-reaction region and is connected with the first liquid outlet.

In some embodiments, the detection chip further includes a second liquid inlet and a second liquid outlet penetrating through the second substrate in the second substrate and in the non-reaction region, wherein the second communication grooves arranged in the second direction constitute a second communication channel, and two ends of the second communication channel are respectively communicated with the second liquid inlet and the second liquid outlet.

In some embodiments, the second liquid inlet and the second liquid outlet are respectively on opposite sides of the reaction region in the second direction.

In some embodiments, a line connecting a center of the second liquid inlet and a center of the second liquid outlet extends in the second direction and passes through the center of the reaction region.

In some embodiments, the detection chip further includes a second inlet connection groove and a second outlet connection groove corresponding to the second communication channel on the side of the first substrate facing the second substrate, wherein one end of the second inlet connection groove is connected with one end of a corresponding second communication channel, and the other end of the second inlet connection groove extends to the non-reaction region and is connected with the second liquid inlet; and one end of the second outlet connection groove is connected with the other end of the corresponding second communication channel, and the other end of the second outlet connection groove extends to the non-reaction region and is connected with the second liquid outlet.

In some embodiments, a width of the first communication groove ranges from 20 μm to 30 μm; and a width of the second communication groove ranges from 10 μm to 20 μm.

In some embodiments, the first substrate includes: a base substrate and a hole defining layer on a side of the base substrate facing the second substrate; the hole defining layer has a first hole structure in a region where the first communication groove is to be formed, the first communication groove including the first hole structure; the hole defining layer has a second hole structure in a region where the second communication groove is to be formed, the second communication groove including the second hole structure; and the hole defining layer has a third hole structure in a region where the reaction groove is to be formed, the reaction groove including the third hole structure.

In some embodiments, the detection chip further includes a first inlet connection groove and a first outlet connection groove on the side of the first substrate facing the second substrate, wherein the hole defining layer has a fourth hole structure in a region where the first inlet connection groove is to be formed and a fifth hole structure in a region where the first outlet connection groove is to be formed, the first inlet connection groove including the fourth hole structure, and the first outlet connection groove including the fifth hole structure.

In some embodiments, the detection chip further includes a second inlet connection groove and a second outlet connection groove on the side of the first substrate facing the second substrate, wherein the hole defining layer has a sixth hole structure in a region where the second inlet connection groove is to be formed and a seventh hole structure in a region where the second outlet connection groove is to be formed, the second inlet connection groove including the sixth hole structure, and the second outlet connection groove including the seventh hole structure.

In some embodiments, the detection chip further includes a heating electrode between the base substrate and the hole defining layer, the heating electrode being configured to heat the reaction groove.

In some embodiments, the detection chip further includes a control electrode between the heating electrode and the base substrate, and a first insulating layer between the control electrode and the heating electrode, wherein the control electrode is connected to the heating electrode through a via hole in the first insulating layer, and the control electrode is configured to apply an electrical signal to the heating electrode.

In some embodiments, the detection chip further includes a second insulating layer between the heating electrode and the hole defining layer, and a light shielding layer between the second insulating layer and the hole defining layer, wherein the light shielding layer has a hollow structure in a region where the reaction groove is to be formed, the reaction groove further including the hollow structure.

In some embodiments, the detection chip further includes first accommodation groove on a side of the base substrate facing the hole defining layer in a region where the reaction groove is to be formed, the reaction groove further including the first accommodation groove.

In some embodiments, the first communication groove includes: a first portion, a second portion and a third portion sequentially connected along the first direction, the first portion and the third portion being respectively connected with the two adjacent reaction grooves, and the second portion being connected with the second communication groove; the base substrate has a second accommodation groove in a region where the first portion is to be formed, and a third accommodation groove in a region where the third portion is to be formed, the second accommodation groove and the third accommodation groove being both connected with a corresponding first accommodation groove; and the first communication groove further includes the second accommodation groove and the third accommodation groove.

In some embodiments, the detection chip further includes a light shielding layer between the base substrate and the hole defining layer, wherein the light shielding layer has a hollow structure in a region where the reaction groove is to be formed, the reaction groove further including the hollow structure.

In some embodiments, the second substrate includes: a cover plate and a heating electrode on a side of the cover plate facing the first substrate, and the heating electrode is configured to heat the reaction groove.

In some embodiments, the detection chip further includes a first protection layer on a side of the heating electrode facing away from the cover plate.

In some embodiments, the detection chip further includes a control electrode between the heating electrode and the cover plate, and a first insulating layer between the control electrode and the heating electrode, wherein the control electrode is connected with the heating electrode through a via hole in the first insulating layer, and the control electrode is configured to apply an electrical signal to the heating electrode.

In some embodiments, a material of the hole defining layer includes: a photoresist.

In some embodiments, the detection chip further includes a hydrophilic layer on a bottom of the reaction groove, a sidewall of the reaction groove, a bottom of the first communication groove, and/or a sidewall of the first communication groove.

In some embodiments, the detection chip further includes a hydrophobic layer on a bottom of the second communication groove and/or a sidewall of the second communication groove.

In some embodiments, a number of the at least one functional region is plural.

In a second aspect, the embodiment of the present disclosure further provides a method for fabricating the detection chip of the first aspect, wherein the detection chip has at least one functional region, the functional region including: a reaction region and a non-reaction region surrounding the reaction region, and the method includes: fabricating a first substrate and a second substrate respectively; forming a plurality of reaction grooves arranged in an array along a first direction and a second direction on a side of the first substrate; forming first communication grooves, each of which is between two reaction grooves adjacent in the first direction and connected with the two reaction grooves, and extends along the first direction; forming second communication grooves, each of which is between two first communication grooves adjacent in the second direction and connected with the two first communication grooves, and extends along the second direction, wherein the first direction intersects the second direction; arranging a side of the first substrate provided with the plurality of reaction grooves, the first communication grooves and the second communication grooves, to be opposite to the second substrate; and encapsulating the first substrate and the second substrate.

In a third aspect, the embodiment of the present disclosure further provides a sample introduction method for the detection chip of the first aspect, the sample introduction method including: injecting a sample solution into the plurality of reaction grooves through the first communication grooves; and injecting an oil phase material into the second communication grooves to isolate the sample solution in the reaction grooves by using the oil phase material.

DETAIL DESCRIPTION OF EMBODIMENTS

In order to make those skilled in the art better understand the technical solutions of the present disclosure, a detection chip, a fabricating method for a detection chip and a sample introduction method for a detection chip according to the present disclosure will be described in further detail with reference to the accompanying drawings.

To make objects, technical solutions and advantages of embodiments of the present disclosure more apparent, the technical solutions of the embodiments of the present disclosure will be clearly and completely described below with reference to the drawings of the embodiments of the present disclosure. It is apparent that the described embodiments are only part, not all, of the embodiments of the present disclosure. All other embodiments, which may be derived by a person skilled in the art from the described embodiments of the present disclosure without creative effort, are within the scope of protection of the present disclosure.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “include”, “comprise”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationship may also be changed accordingly.

Figure 1:
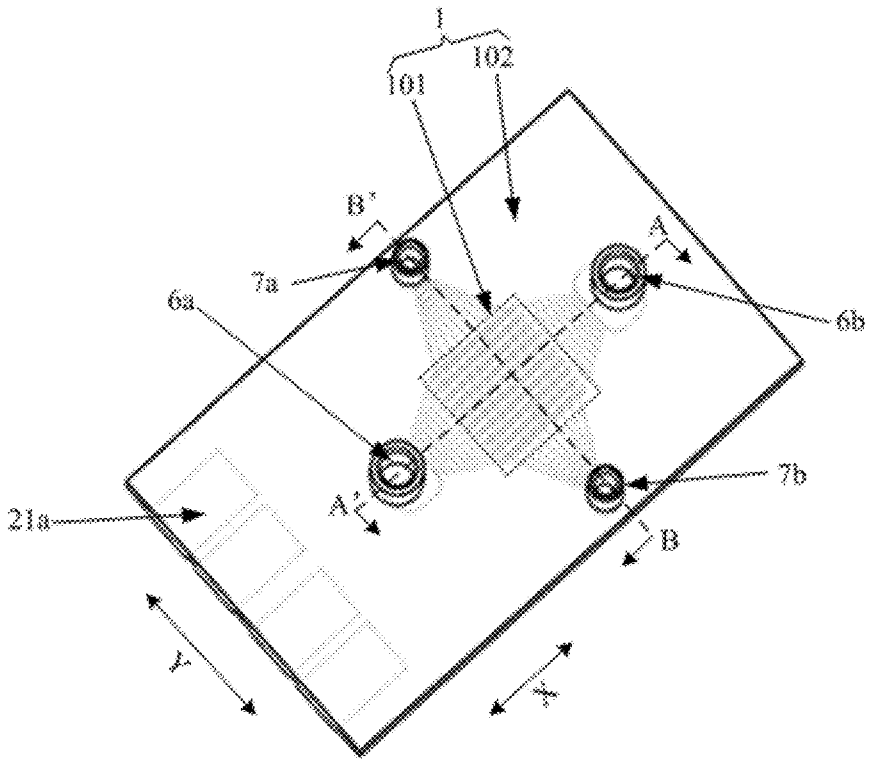
FIG. 1 is a schematic structural diagram of a detection chip according to an embodiment of the present disclosure.
Figure 2:
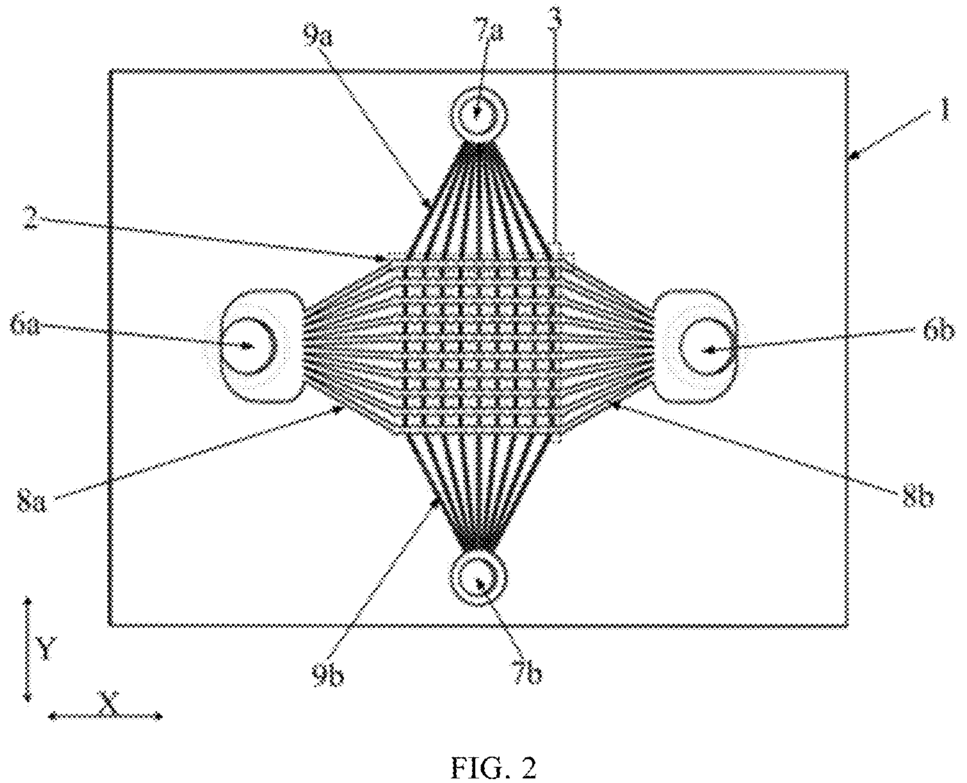
FIG. 2 is a schematic top view of a detection chip according to an embodiment of the present disclosure.
Figure 3:
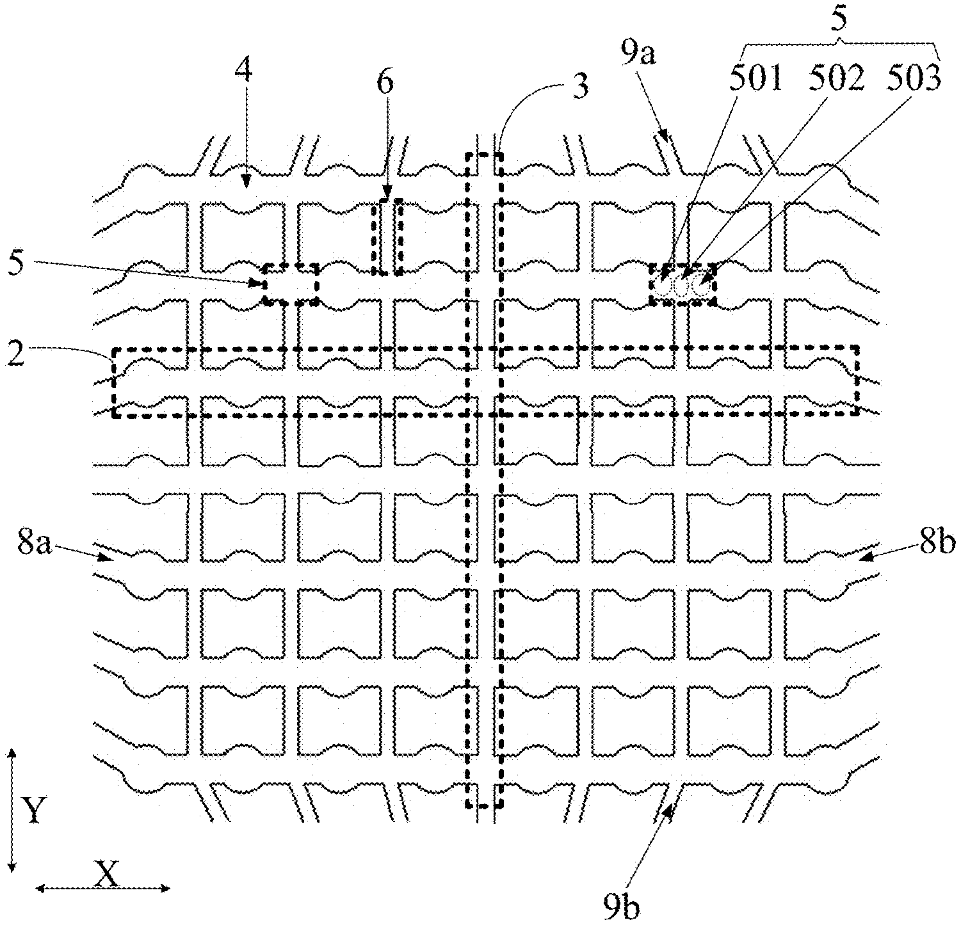
FIG. 3 is a schematic top view of a reaction region according to an embodiment of the present disclosure.
Figure 4:
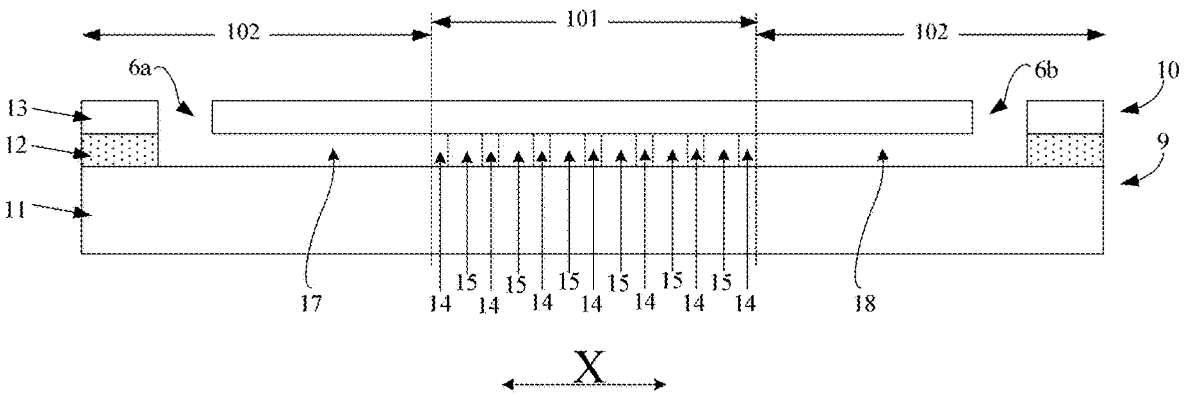
FIG. 4 is a schematic cross-sectional view taken along line A-A' of FIG. 1.
Figure 5:
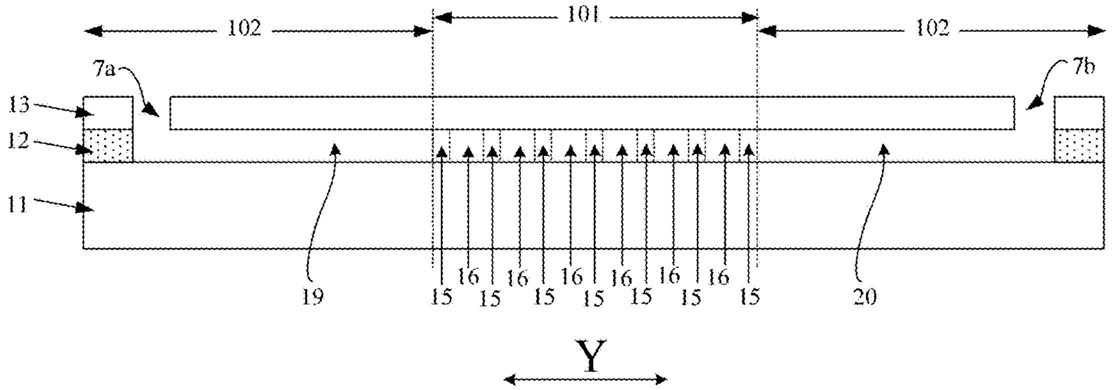
FIG. 5 is a schematic cross-sectional view taken along line B-B' of FIG. 1.

FIG. 1 is a schematic structural diagram of a detection chip according to an embodiment of the present disclosure, FIG. 2 is a schematic top view of a detection chip according to an embodiment of the present disclosure, FIG. 3 is a schematic top view of a reaction region according to an embodiment of the present disclosure, FIG. 4 is a schematic cross-sectional view taken along A-A' line in FIG. 1, and FIG. 5 is a schematic cross-sectional view taken along B-B' line in FIG. 1. As shown in FIGS. 1 to 5, the detection chip has at least one functional region 1, and the functional region 1 includes: a reaction region 101 and a non-reaction region 102 surrounding the reaction region 101. The detection chip includes a first substrate 9 and a second substrate 10 opposite to each other. In the reaction region 101, a side of the first substrate 9 facing the second substrate 10 is provided with a plurality of reaction grooves 4 which are arranged in an array along a first direction X and a second direction Y. A first communication groove 5 connected with two reaction grooves 4 adjacent in the first direction X is arranged between the two reaction grooves 4, and the first communication groove 5 extends along the first direction X. A second communication groove 6 connected with two first communication grooves 5 adjacent in the second direction Y is arranged between the two first communication grooves 5, the second communication groove 6 extends along the second direction Y, and the first direction X intersects with the second direction Y.

During sample introduction, a sample solution is injected into the reaction grooves 4 through the first communication grooves 5, and the sample solution may fully enter into each reaction groove 4 (i.e., inputting water phase material); then, an oil phase material for liquid seal is injected into the second communication grooves 6 (i.e., inputting oil phase material), and the sample solution in the first communication groove may be cut into two portions by the oil phase material for liquid seal, so that oil phase isolation (that is, isolate/separate the sample solution by using the oil phase material) can be achieved in respective reaction grooves 4. The oil phase material for liquid seal may be mineral oil, liquid paraffin, palmitic acid isopropyl ester, butyl laurate, perfluoroalkane oil, etc.

It should be noted that, in the embodiment of the present disclosure, the shape of the orthographic projection of the reaction groove 4 on the second substrate 10 may be a circle, a square, or other regular or irregular shape, which is not limited in the present disclosure. In some embodiments, the aperture size of the reaction groove 4 is in the range of 40 μm to 60 μm, such as 50 μm.

The detection chip according to the embodiment of the disclosure has a simple structure and is easy to be fabricated; simultaneously, the introduction process of the detection chip is stable and the introduction efficiency is high, which can make the sample solution fully enter into each reaction groove 4, so as to effectively improve the uniformity of the sample solution in each reaction groove 4.

In some embodiments, the first direction X is perpendicular to the second direction Y; in the process of injecting the oil phase material for liquid seal, the flow direction of the oil phase material is perpendicular to the extending direction of the first communication groove 5, so that the oil phase material has a better cutting effect on the sample solution in the first communication groove 5.

In some embodiments, a first liquid inlet 6*a* and a first liquid outlet 6*b* penetrating the second substrate 10 are provided in the second substrate 10 and in the non-reaction region 102; the reaction grooves 4 and the first communication grooves 5 alternately arranged in the first direction X form a first communication channel 2, and two ends of the first communication channel 2 are respectively communicated with the first liquid inlet 6*a* and the first liquid outlet 6*b*. In the sample introduction process, the sample solution may be input and injected into the first communication channel 2 through the first liquid inlet 6*a*. In order to ensure the injection effect of the sample solution as much as possible, a negative pressure may be applied to the first liquid outlet 6*b* (for example, the first liquid outlet 6*b* is vacuumized) while the sample solution is injected into the first liquid inlet 6*a*. When all the reaction grooves 4 are filled with the sample solution, the injection of the sample solution is stopped. In general, the first communication channel 2 is filled with the sample solution at this time.

In some embodiments, the first liquid inlet 6*a* and the first liquid outlet 6*b* are respectively located on opposite sides of the reaction region 101 in the first direction X. This design can make the sample solution entering the first communication channel 2 move preferentially along the first direction X to ensure rapid injection of the sample solution into the reaction grooves 4 in the first communication channel 2. Further, a line connecting the center of the first liquid inlet 6*a* and the center of the first liquid outlet 6*b* extends in the first direction X and passes through the center of the reaction region 101, which is favorable to the uniform input of the sample solution to each first communication channel 2 and the uniform discharge of gas from the first communication channel 2, so as to ensure that the sample solution is fully injected into each reaction groove 4.

In some embodiments, a first inlet connection groove 8*a* and a first outlet connection groove 8*b* corresponding to the first communication channel 2 are further provided on the side of the first substrate 9 facing the second substrate 10; one end of the first inlet connection groove 8*a* is connected to one end of the corresponding first communication channel 2, and the other end of the first inlet connection groove 8*a* extends to the non-reaction region 102 and is connected to the first liquid inlet 6*a*; one end of the first outlet connection groove 8*b* is connected to the other end of the corresponding first communication channel 2, and the other end of the first outlet connection groove 8*b* extends to the non-reaction region 102 and is connected to the first liquid outlet 6*b*.

In some embodiments, a second liquid inlet 7*a* and a second liquid outlet 7*b* penetrating the second substrate 10 are formed in the second substrate 10 and in the non-reaction region 102; the second communication grooves 6 arranged in the second direction Y constitute a second communication channel 3, and both ends of the second communication channel 3 are respectively communicated with the second liquid inlet 7*a* and the second liquid outlet 7*b*. After the injection of the sample solution is completed, the oil phrase material may be input to the second communication channel 3 through the second liquid inlet 7*a*. In order to ensure the injection effect of the oil phase material as much as possible, a negative pressure may be applied to the second liquid outlet 7*b* (for example, the second liquid outlet 7*b* is vacuumized) while the oil phase material is injected into the second liquid inlet 7*a*. When no bubble is discharged from the second liquid outlet 7*b*, the injection of oil phase material is stopped.

In some embodiments, the second liquid inlet 7*a* and the second liquid outlet 7*b* are respectively located on opposite sides of the reaction region 101 in the second direction Y. This design can make the oil phase material that gets into the second communication channel 3 have a higher flow speed in second direction Y to promote the cutting effect on the sample solution in the first communication groove 5. Further, a line connecting the center of the second liquid inlet 7*a* and the center of the second liquid outlet 7*b* extends in the second direction Y and passes through the center of the reaction region 101, which is favorable to the uniform input of oil phase material to each second communication channel 3 and the uniform discharge of gas from the second communication channel 3, so as to ensure that the oil phase material is fully injected into each second communication groove 6.

In some embodiments, a second inlet connection groove 9*a* and a second outlet connection groove 9*b* corresponding to the second communication channel 3 are further provided on the side of the first substrate 9 facing the second substrate 10; one end of the second inlet connection groove 9*a* is connected with one end of the corresponding second communication channel 3, and the other end of the second inlet connection groove 9*a* extends to the non-reaction region 102 and is connected with the second liquid inlet 7*a*; one end of the second outlet connection groove 9*b* is connected to the other end of the corresponding second communication channel 3, and the other end of the second outlet connection groove 9*b* extends to the non-reaction region 102 and is connected to the second liquid outlet 7*b*.

In the embodiment of the disclosure, the first communication channel 2 for transmitting the sample solution and the second communication channel 3 for transmitting the oil phase material are independently arranged, and thus in the sample introduction process, it is only required to inject the sample solution into the first communication channel 2 firstly, and then inject the oil phase material into the second communication channel 3, so the whole sample introduction process is relatively simple and easy to operate.

In some embodiments, the width of the first communication groove 5 is greater than the width of the second communication groove 6. That is, the width of the first communication groove 5 is relatively wider, while the width of the second communication groove 6 is relatively narrower. The wider first communication groove 5 can effectively increase the speed of injecting the sample solution into the reaction groove 4, and is beneficial to reducing the sample introduction time; the injection of oil phase material is for cutting the sample solution in the first communication groove 5, and the narrower second communication groove 6 can realize a larger flow speed of the oil phase material, so as to make the cutting effect on the sample solution in the first communication groove 5 better. In some embodiments, the width of the first communication groove 5 ranges from 20 μm to 30 μm; and the width of the second communication groove 6 ranges from 10 μm to 20 μm.

In some embodiments, the depth of the reaction groove 4 is greater than or equal to the depth of the second communication groove 6. In an embodiment of the present disclosure, the depth of the reaction groove 4 may be greater than the depth of the second communication groove 6, and in this case, more volume of sample solution may be contained in the reaction groove 4.

In some embodiments, the first communication groove 5 includes: a first portion 501, a second portion 502 and a third portion 503 which are sequentially connected along the first direction X, the first portion 501 and the third portion 503 are respectively connected with two adjacent reaction grooves, and the second portion 502 is connected with the second communication groove 6; the depth of the first portion 501 and the depth of the third portion 503 are both greater than or equal to the depth of the second communication groove 6; and the depth of the second portion 502 is equal to the depth of the second communication groove 6. The depth of the second portion 502 of the first communication groove 5 connected with the second communication groove 6 is set to be equal to the depth of the second communication groove 6, and in this case the depth throughout the second communication channel 3 is kept consistent, so the oil phase material can rapidly flow in the second communication channel 3, and the cutting effect of the oil phase material on the sample solution can be improved. Meanwhile, the depths of the first and third portions 501 and 503 of the first communication groove 5 connected to the reaction groove 4 may be greater than the depth of the second communication groove 6, so that more sample solution may exist around the reaction groove 4, thus facilitating the injection of the sample solution into the reaction groove 4.

Referring to FIGS. 4 and 5, in some embodiments, the first substrate 9 includes: a base substrate 11 and a hole defining layer 12 located on a side of the base substrate 11 facing the second substrate 10. The base substrate 11 may be a glass substrate; the hole defining layer 12 may be formed with hole structures which may be configured to form the reaction groove 4, the first communication groove 5, the second communication groove 6, the first inlet connection groove 8*a*, the first outlet connection groove 8*b*, the second inlet connection groove 9*a* and the second outlet connection groove 9*b*.

It should be noted that various hole structures in the hole defining layer 12 in the embodiment of the present disclosure may be selectively configured as a through hole structure penetrating through the hole defining layer 12 or a blind hole structure not penetrating through the hole defining layer 12 (the blind hole structure may be regarded as a groove formed on the hole defining layer 12).

The hole defining layer 12 is provided with a first hole structure 15 in a region where the first communication groove 5 is to be formed, the first communication groove 5 including the first hole structure 15; the hole defining layer 12 is further provided with a second hole structure 16 in a region where the second communication groove 6 is to be formed, the second communication groove 6 including the second hole structure 16; and the hole defining layer 12 is further provided with a third hole structure 14 in a region where the reaction groove 4 is to be formed, the reaction groove 4 including the third hole structure 14.

In some embodiments, in a case where the first communication groove 5 includes only the first hole structure 15, the first hole structure 15 may be a through hole structure or a blind hole structure; in a case where the second communication groove 6 includes only the second hole structure 16, the second hole structure 15 may be a through hole structure or a blind hole structure; and in a case where the reaction groove 4 includes only the third hole structure 14, the third hole structure 14 may be a through hole structure or a blind hole structure. In some embodiments, the depths of the first hole structure 15, the second hole structure 16, and the third hole structure 14 are the same.

In some embodiments, in a case where the first inlet connection groove 8*a* and the first outlet connection groove 8*b* are provided on the side of the first substrate 9 facing the second substrate 10, a fourth hole structure 17 is provided in the hole defining layer 12 in a region where the first inlet connection groove 8*a* is to be formed, and a fifth hole structure 18 is provided in the hole defining layer 12 in a region where the first outlet connection groove 8*b* is to be formed, the first inlet connection groove 8*a* including the fourth hole structure 17, and the first outlet connection groove 8*b* including the fifth hole structure 18.

In some embodiments, in a case where the second inlet connection groove 9*a* and the second outlet connection groove 9*b* are provided on the side of the first substrate 9 facing the second substrate 10, a sixth hole structure 19 is provided in the hole defining layer 12 in a region where the second inlet connection groove 9*a* is to be formed, and a seventh hole structure 20 is provided in the hole defining layer 12 in a region where the second outlet connection groove 9*b* is to be formed, the second inlet connection groove 9*a* including the sixth hole structure 19, and the second outlet connection groove 9*b* including the seventh hole structure 20.

Figure 6:
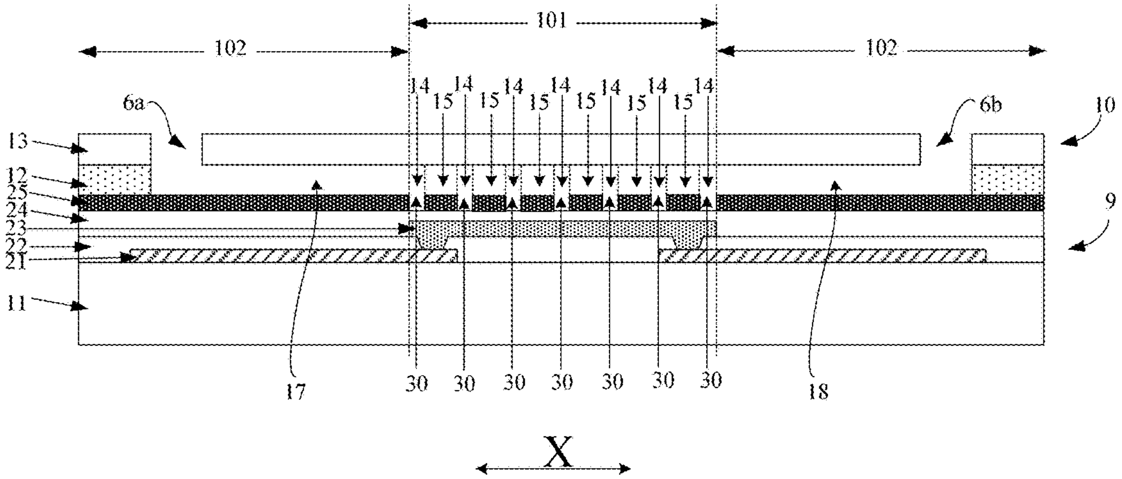
FIG. 6 is another schematic cross-sectional view taken along line A-A' of FIG. 1.
Figure 7:
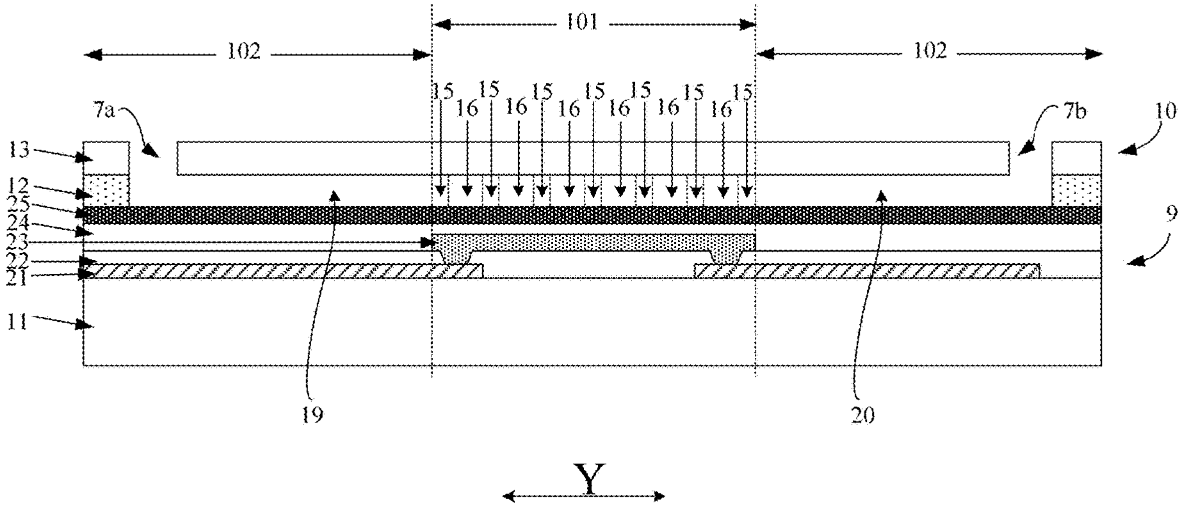
FIG. 7 is another schematic cross-sectional view taken along line B-B' of FIG. 1.

FIG. 6 is another schematic sectional view taken along line A-A' of FIG. 1, and FIG. 7 is another schematic sectional view taken along line B-B' of FIG. 1. As shown in FIGS. 6 and 7, in some embodiments, a heating electrode 23 is disposed between the base substrate 11 and the hole defining layer 12, and the heating electrode 23 is configured to heat a region where the reaction groove 4 is located.

During PCR reaction, the double-stranded structure of DNA fragment is denatured at high temperature to form single-stranded structure, primer and the single stranded structure are combined at low temperature according to base complementary pairing principle, and base combination and extension are realized at the most suitable temperature of DNA polymerase. The above-mentioned process is the temperature cycle process of denaturation-annealing-extension. Through multiple temperature cycle processes of denaturation-annealing-extension, mass replication of the DNA fragment can be realized. In order to realize the above temperature cycle process, a series of external devices are usually required to heat and cool the detection chip, resulting in that the device is large in size, complex in operation and high in cost. In addition, in the process of heating and cooling the detection chip, the overall temperature of the detection chip changes, such that the temperature of other structures and components of the detection chip except the microcavity containing the DNA fragment changes, which increases the damage risk of the components such as a circuit. The general DPCR product is mostly matched with a liquid drop fabrication system, resulting in that the cost of the detection chip is high and the fabrication process is complex.

In order to overcome above technical problem, the heating electrode 23 is disposed in the first substrate 9 in the embodiment of the present disclosure, so as to effectively control the temperature of the micro reaction chamber, effectively control the temperature of the reaction groove 4 of the detection chip, and realize temperature cycle without driving the liquid drop and without external heating device. Thus, the detection chip has high integration, simple operation and low production cost, and can realize effective sample introduction.

The heating electrode 23 may receive an electrical signal, whereby when an electrical current flows through the heating electrode, heat is generated, which is conducted to at least a portion of the micro reaction chamber (or reaction groove) for regulating the temperature of the micro reaction chamber. The heating electrode may be made of a conductive material with high resistivity, so that the heating electrode can generate more heat under the condition of a small electrical signal, and the energy conversion rate is improved. In some embodiments, the heating electrode 23 may be made of a transparent conductive material, such as indium tin oxide (ITO), tin oxide, etc., or may be made of other suitable materials, such as metal, etc., which is not limited in the embodiments of the present disclosure.

In an embodiment of the present disclosure, the heating electrode 23 may be a planar electrode, for example, a conductive material uniformly formed on the base substrate 11, so that the plurality of micro reaction chambers are uniformly heated. Of course, the embodiment of the present disclosure is not limited thereto, and the heating electrode 23 may also have a specific pattern or shape, such as a zigzag shape, an arc shape, etc., which may be determined according to the distribution of the plurality of reaction grooves 4.

In some embodiments, a control electrode 21 is disposed between the heating electrode 23 and the base substrate 11, a first insulating layer 22 is disposed between the control electrode 21 and the heating electrode 23, the control electrode 21 is connected to the heating electrode 23 through a via hole in the first insulating layer 22, and the control electrode 21 is configured to transmit an external electrical signal to the heating electrode.

The number of the control electrodes 21 may be one or more, which is not limited in the embodiment of the present disclosure. In a case where a plurality of control electrodes 21 are used to apply the electrical signal to the heating electrode 23, different portions of the heating electrode 23 may receive the electrical signal at the same time, so that the heating of the heating electrode 23 is more uniform. For example, in a case of a plurality of control electrodes 21, the first insulating layer 22 may include a plurality of via holes each exposing a part of the control electrodes 21, so that the heating electrode 23 is electrically connected to the plurality of control electrodes 21 through the plurality of via holes, respectively. For example, the plurality of control electrodes 21 are in one-to-one correspondence with the plurality of via holes. For another example, the number of the plurality of via holes may be greater than the number of the plurality of control electrodes 21, and each control electrode is electrically connected to the heating electrode 23 through one or more via holes.

The control electrode 21 may be made of a material having a relatively small resistivity, thereby reducing energy loss at the control electrode 21. The control electrode 21 may be made of a metal material, for example, copper or a copper alloy, aluminum or an aluminum alloy, and the like, and may be a single metal layer or a composite metal layer, which is not limited in the embodiment of the present disclosure.

In some embodiments of the present disclosure, the heating electrode 23 is made of indium tin oxide (ITO) or tin oxide, and the control electrode 21 is made of a metal material. Since the ITO is not easily oxidized, oxidation of the part of the heating electrode exposed to the air can be prevented, and problems such as uneven heating or increased power consumption caused by oxidation of the heating electrode 23 can be avoided. The control electrode is covered by the insulating layer, so that the problem of oxidation is less likely to occur even if the control electrode is made of a metal material.

In order to facilitate electrical connection of the control electrode 21 with an external electrical signal supply device so that the control electrode 21 receives the electrical signal, the control electrode 21 may further include a contact portion 21*a*, and the contact portion 21*a* extends to an edge of the base substrate 11 and is not covered by the first insulating layer 22. For example, the contact portion 21*a* is in the shape of a large-sized square (four contact portions are exemplarily shown in FIGS. 1 and 2), so that the contact portion 21*a* can be easily in contact connection with a probe or an electrode in an electrical signal supply device with a large contact area, enabling stable reception of the electrical signal. In this way, plug and play of the detection chip can be realized, and the detection chip is easy to operate and use. For example, in a case where the control electrode is made of a metal material, the contact portion may be subjected to plating, thermal spraying, vacuum plating, or the like, thereby forming protection on the surface of the contact portion 21*a* to prevent the contact portion from being oxidized without affecting its conductive properties.

In some embodiments, a second insulating layer 24 is disposed between the heating electrode 23 and the hole defining layer 12, a light shielding layer 25 is disposed between the second insulating layer 24 and the hole defining layer 12, and a hollow structure 30 is disposed in the light shielding layer 25 at a region where the reaction groove 4 is to be formed; and the reaction groove 4 further includes the hollow structure 30. Generally, after the PRC reaction is finished in the reaction groove 4, the optical detection is performed on the reaction groove 4 to obtain a fluorescence image. By configuring the light shielding layer to block other regions except the region where the reaction groove 4 is located, so as to avoid external light interfering with the reaction groove 4, which is conducive to improving the accuracy of optical detection.

It should be noted that, in a case where the reaction groove 4 includes a hollow structure, the third hole structure 14 is a through hole structure to ensure communication with the hollow structure 30.

Figure 8:
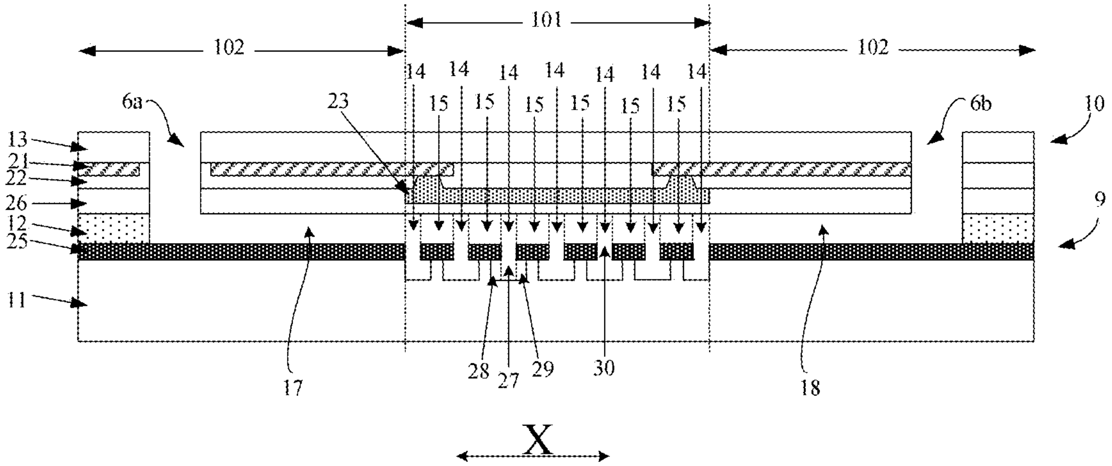
FIG. 8 is another schematic cross-sectional view taken along line A-A' of FIG. 1.
Figure 9:
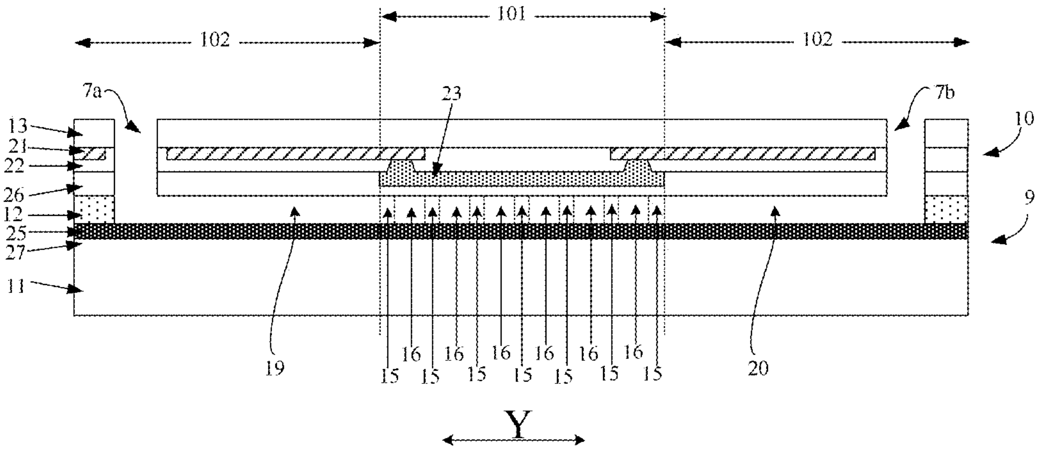
FIG. 9 is another schematic cross-sectional view taken along line B-B' of FIG. 1.
Figure 10:
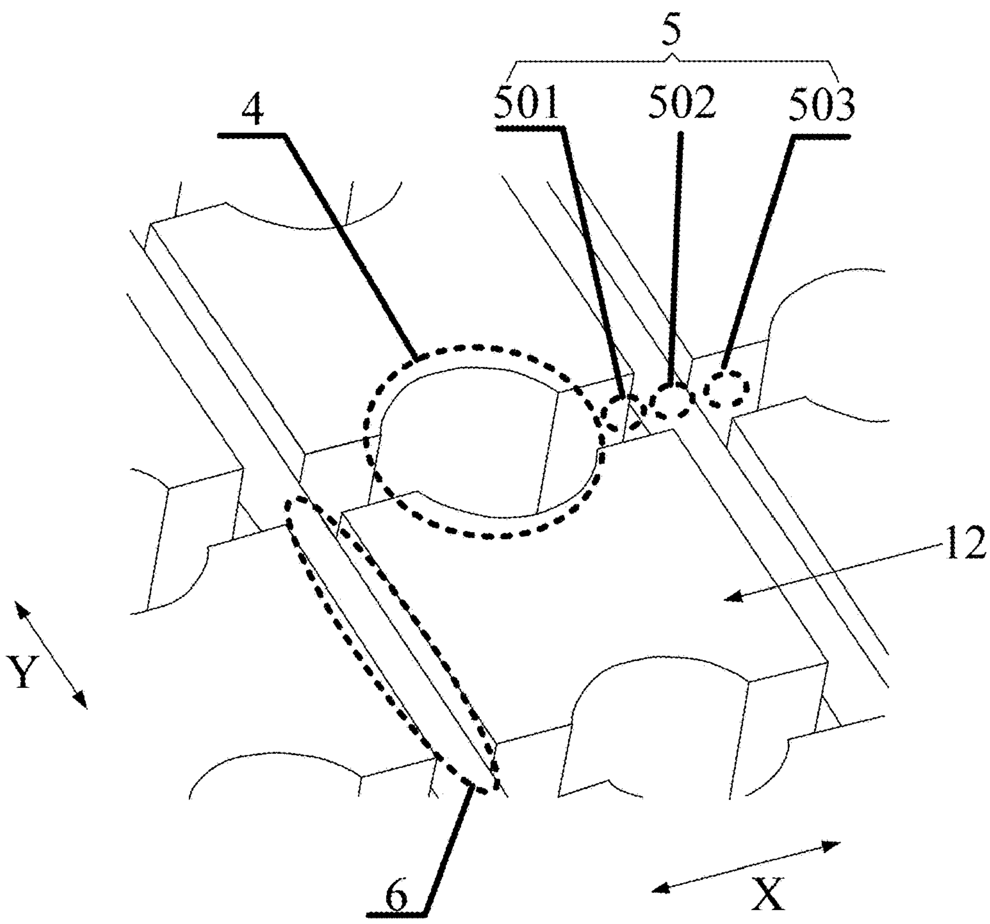
FIG. 10 is a schematic diagram of an upper part of a detection chip according to an embodiment of the present disclosure.
Figure 11:
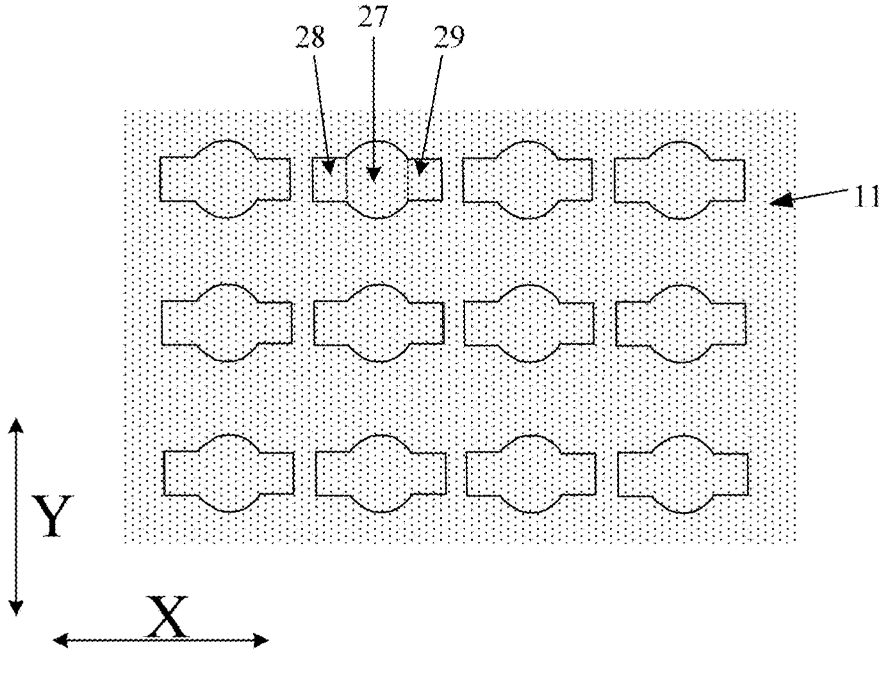
FIG. 11 is a schematic top view of a partial region of a base substrate of FIG. 10.

FIG. 8 is another schematic cross-sectional view taken along line A-A' in FIG. 1, FIG. 9 is another schematic cross-sectional view taken along line B-B' in FIG. 1, FIG. 10 is a schematic diagram of an upper part of a detection chip according to an embodiment of the present disclosure, and FIG. 11 is a schematic top view of a partial region of the base substrate of FIG. 10. As shown in FIGS. 8 to 11, in some embodiments, the base substrate 11 is provided with a first accommodation groove 27 at a side facing the hole defining layer 12 and in a region where the reaction groove 4 is to be formed, and the reaction groove 4 further includes the first accommodation groove 27. In the embodiment of the present disclosure, by providing the first accommodation groove 27 in the base substrate 11, the first accommodation groove 27 serves as a part of the reaction groove 4, so that the depth of the reaction groove 4 can be effectively increased, and more sample solution can be injected into the reaction groove 4, which is more convenient for detection. It should be noted that, in a case where the reaction groove 4 includes the first accommodation groove 27, the third hole structure 14 is a through hole structure to ensure communication with the first accommodation groove 27.

In some embodiments, the first communication groove 5 includes: the first portion 501, the second portion 502 and the third portion 503 which are sequentially connected along the first direction X, the first portion 501 and the third portion 503 being respectively connected with two adjacent reaction grooves 4, and the second portion 502 being connected with the second communication groove 6 (the second portion 502 is located in the flow path of the second communication channel 3). A second accommodation groove 28 is formed in a region of the base substrate 11 where the first portion 501 is to be formed, a third accommodation groove 29 is formed in a region of the base substrate 11 where the third portion 503 is to be formed, and the second accommodation groove 28 and the third accommodation groove 29 are connected with the corresponding first accommodation groove 27; and the first communication groove 5 further includes the second accommodation groove 28 and the third accommodation groove 29.

In some embodiments, the depths of the first and third portions 501 and 503 are the same as the depth of the reaction groove 4 and are greater than the depth of the second communication groove 6, and the depth of the second portion is the same as the depth of the second communication groove 6.

In some embodiments, the light shielding layer 25 is disposed between the base substrate 11 and the hole defining layer 12, and the hollow structure 30 is disposed in a region of the light shielding layer 28 where the reaction groove 4 is to be formed; and the reaction groove 4 further includes the hollow structure 30. In a case where the light shielding layer 25 is made of a black resin material and the base substrate 11 is a glass substrate, an auxiliary layer may be provided between the base substrate 11 and the light shielding layer, in order to increase the bonding strength between the base substrate and the light shielding layer, since the black resin material is easily peeled off from the surface of the glass substrate. The material of the auxiliary layer includes an inorganic insulating material such as silicon oxide, silicon nitride, or a stack structure thereof.

In some embodiments, the second substrate 10 includes: a cover plate 13 and the heating electrode 23 on a side of the cover plate 13 facing the first substrate 9, and the heating electrode 23 is configured to heat the region where the reaction groove 4 is located. The cover plate 13 may be a glass cover plate 13 or a rigid plastic cover plate 13.

In some embodiments, the side of the heating electrode 23 facing away from the cover plate 13 is provided with a first protection layer 26 to avoid direct contact of the heating electrode 23 with the sample solution or the oil phase material.

In some embodiments, the control electrode 21 is disposed between the heating electrode 23 and the cover plate 13, the first insulating layer 22 is disposed between the control electrode 21 and the heating electrode 23, the control electrode 21 is connected to the heating electrode 23 through a via hole in the first insulating layer 22, and the control electrode 21 is configured to apply an electrical signal to the heating electrode 23.

Referring to FIGS. 4 to 9, in some embodiments, the material of the hole defining layer 12 includes photoresist. In this case, the photoresist may be exposed and developed to form corresponding hole structures.

In some embodiments, a bottom of the reaction groove 4, a sidewall of the reaction groove 4, a bottom of the first communication groove 5, and/or a sidewall of the first communication groove 5 are provided with a hydrophilic layer (not shown). By providing the hydrophilic layer on at least one of the bottom of the reaction groove 4, the sidewall of the reaction groove 4, the bottom of the first communication groove 5, and the sidewall of the first communication groove 5, the sample solution can be easily defined in the first communication channel 2. The hydrophilic layer is arranged at the bottom of the reaction groove 4 and/or the sidewall of the reaction groove 4, which is beneficial for the sample solution to enter into the reaction groove 4.

In some embodiments, the bottom of the second communication groove 6 and/or the sidewall of the second communication groove 6 are provided with a hydrophobic layer (not shown) to facilitate better adsorption of the oil phase material for liquid seal into the second communication channel 3.

In some embodiments, a second protection layer (not shown) is also provided on the side of the hole defining layer 12 facing away from the base substrate 11 to avoid direct contact of the hole defining layer 12 with the sample solution or oil phase material. It should be noted that, in a case where the hydrophilic/hydrophobic layer and the second protection layer are both disposed in the detection chip, the hydrophilic/hydrophobic layer is disposed at a corresponding position on a side of the second protection layer facing away from the base substrate 11.

Of course, the second protection layer may also be reused as a hydrophilic layer or a hydrophobic layer, in which case no hydrophilic or hydrophobic layer is required if the second protection layer is provided. For example, the second protection layer is made of silicon oxide, the untreated silicon oxide film itself has hydrophilicity, and then the surface of the silicon oxide film in the region where the hydrophobic layer needs to be provided is subjected to treatment (for example, plasma treatment) so that the surface energy of the corresponding region is reduced to exhibit hydrophobicity.

Figure 12:
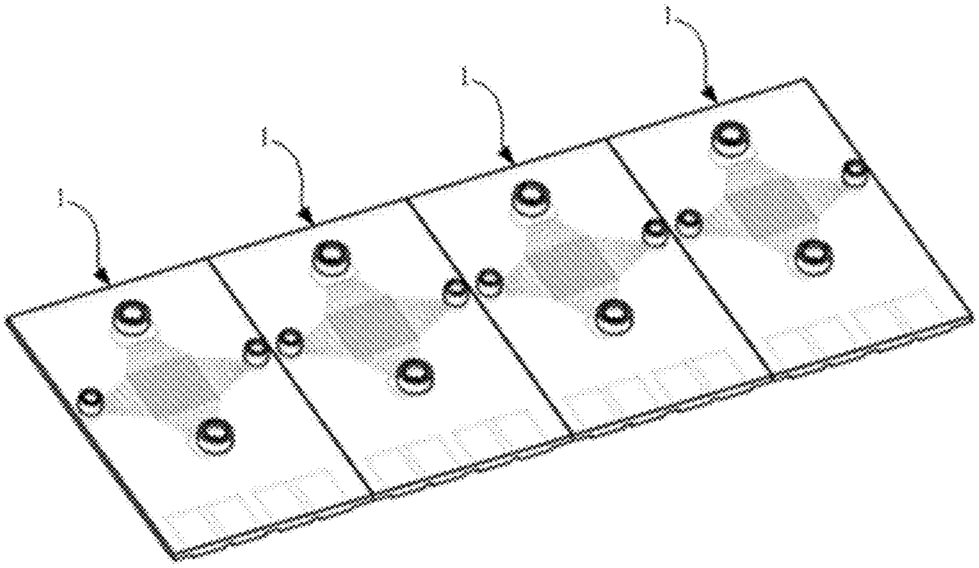
FIG. 12 is another schematic structural diagram of a detection chip according to an embodiment of the present disclosure.

FIG. 12 is another schematic structural diagram of a detection chip according to an embodiment of the present disclosure. As shown in FIG. 12, unlike the previous embodiments, the number of the functional regions 1 in the embodiment of the present disclosure is multiple (four functional regions are exemplarily shown in FIG. 12), that is, a plurality of independent reaction regions 101 are disposed on the detection chip to meet the detection requirement in different application scenarios.

Based on the same inventive concept, an embodiment of the present disclosure further provides a fabrication method of a detection chip, and the fabrication method may be used for fabricating the detection chip according to the above embodiments.

Figure 13:
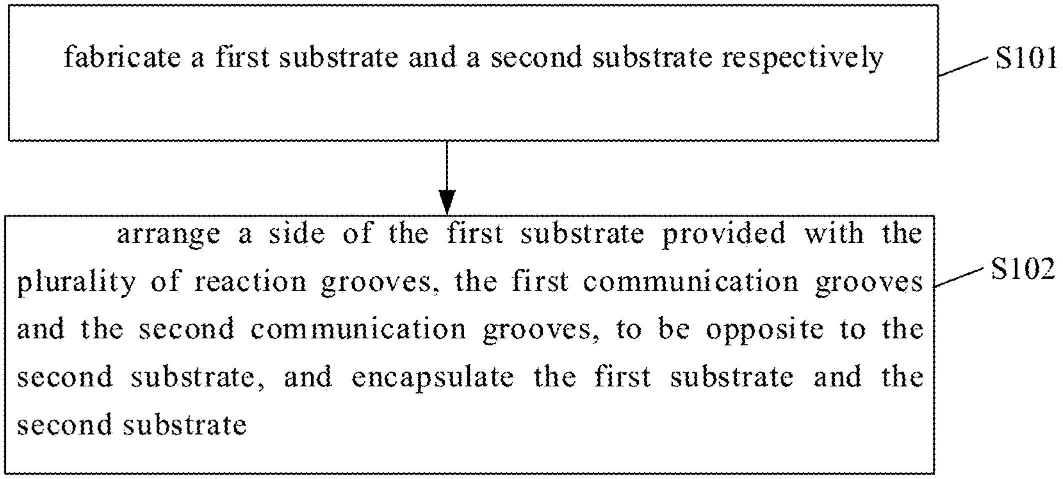
FIG. 13 is a flowchart of a method for fabricating a detection chip according to an embodiment of the present disclosure.

FIG. 13 is a flowchart of a fabrication method of a detection chip according to an embodiment of the disclosure, and as shown in FIG. 13, the method includes Steps S101 and 102.

Step S101 includes fabricating a first substrate and a second substrate respectively.

A side of the first substrate is provided with a plurality of reaction grooves which are arranged in an array along a first direction and a second direction, a first communication groove connected with two reaction grooves adjacent in the first direction is arranged between the two reaction grooves, the first communication groove extends along the first direction, a second communication groove connected with two first communication grooves adjacent in the second direction is arranged between the two first communication grooves, the second communication groove extends along the second direction, and the first direction intersects with the second direction.

The fabrication of the first substrate and the second substrate shown in FIGS. 4 and 5 is described as an example. The process of fabricating the first substrate includes: firstly, providing a base substrate; and then preparing a hole defining layer on the base substrate. The base substrate may be a glass substrate. The process of preparing the hole defining layer may include: firstly, spin-coating the photoresist at the speed of 300 revolutions per minute for 10 seconds, and baking the photoresist for 2 minutes at the temperature of 90° C.; then repeating the spin-coating of the photoresist once and carrying out the process above to obtain a photoresist layer; next, exposing the photoresist layer through a mask plate; next, developing the exposed photoresist layer with a developing solution for 45 seconds, and curing the developed photoresist layer at a temperature of 230° C. for 30 minutes to obtain the hole defining layer. The process of fabricating the second substrate includes: firstly, providing a cover plate; then, forming a first liquid inlet/outlet and a second liquid inlet/outlet in the cover plate, respectively. The cover plate may be a glass cover plate or a hard plastic cover plate; and the first liquid inlet/outlet and the second liquid inlet/outlet may be formed in the cover plate by laser drilling or etching.

It should be noted that, in a case where the first substrate and the second substrate are those shown in FIGS. 6 and 7, a step of preparing a control electrode, a step of preparing a first insulating layer, a step of preparing a heating electrode, a step of preparing a second insulating layer, and a step of preparing a light shielding layer are further included before the step of preparing the hole defining layer in the process of fabricating the first substrate. Optionally, a step of preparing a second protection layer and a step of preparing a hydrophilic/hydrophobic layer may be further included after preparing the hole defining layer.

The material of the control electrode may be a metal material, for example, the control electrode may be a stack structure formed of molybdenum-aluminum neodymium-molybdenum (Mo—AlNd—Mo), molybdenum at a lower layer may have a thickness of 200 Å, aluminum neodymium may have a thickness of 3000 Å, and molybdenum at an upper layer may have a thickness of 800 Å. The material of the first insulating layer may be silicon oxide ($SiO_2$), and the thickness of the first insulating layer may be 3000 Å. The material of the heating electrode may be indium tin oxide (ITO) and the heating electrode may have a thickness of 1350 Å. The material of the second insulating layer may be a stack structure formed of silicon oxide and silicon nitride, the thickness of the silicon oxide may be 1000 Å and the thickness of the silicon nitride ($SiN_x$) may be 2000 Å. The material of the light shielding layer may be a black resin material. The second protection layer may be made of silicon oxide and may have a thickness of 3000 Å, and in this case, the second protection layer serves as the hydrophilic layer and the hydrophobic layer. Specifically, part of the second protection layer (silicon oxide) covering the bottom of the reaction groove, the sidewall of the reaction groove, the bottom of the first communication groove, and the sidewall of the first communication groove exhibits hydrophilicity for reuse as the hydrophilic layer, and part of the second protection layer (silicon oxide) covering the bottom of the second communication groove and the sidewall of the second communication groove is subjected to surface treatment (e.g., plasma treatment) so that the surface energy of the second protection layer at the corresponding position is reduced to exhibit hydrophobicity for reuse as a hydrophobic layer. Of course, the hydrophilic/hydrophobic layer may also be a different structure than the second protection layer.

It should be noted that, in a case where the first substrate and the second substrate are those shown in FIGS. 8 and 9, in the process of fabricating the first substrate, a step of preparing an auxiliary layer and a step of preparing a light shielding layer are further included before the step of preparing the hole defining layer; in the process of fabricating the second substrate, a step of preparing a control electrode, a step of preparing a first insulating layer, a step of preparing a heating electrode, and a step of preparing a first protection layer are further included after the step of forming the first liquid inlet/outlet and the second liquid inlet/outlet in the cover plate respectively. For the step of preparing the light shielding layer, the step of preparing the control electrode, the step of preparing the first insulating layer, and the step of preparing the heating electrode, reference may be made to the foregoing contents, and details are not repeated herein.

The material of the auxiliary layer may be a stack structure formed of silicon oxide and silicon nitride, the thickness of the silicon oxide may be 1000 Å and the thickness of the silicon nitride may be 2000 Å. The material of the first protection layer may be silicon oxide, and the thickness thereof may be 3000 Å.

It should be noted that, in a case where the cover plate is provided with structures such as the control electrode, the first insulating layer, and the first protection layer, the structures arranged on the cover plate do not cover the first liquid inlet/outlet and the second liquid inlet/outlet, so as to ensure that the first liquid inlet/outlet and the second liquid inlet/outlet can be communicated with the corresponding connection grooves on the first substrate.

Step S102 includes arranging a side of the first substrate provided with the reaction groove, the first communication groove and the second communication groove to be opposite to the second substrate, and encapsulating the first substrate and the second substrate.

In step S102, a pressure-sensitive adhesive film may be attached to the side of the second substrate facing the first substrate, and then the first substrate and the second substrate are assembled by a rolling pressure to complete the chip package.

Based on the same inventive concept, an embodiment of the disclosure also provides a sample introduction method of a detection chip, and the sample introduction method is based on the detection chip according to the embodiments described above.

Figure 14:
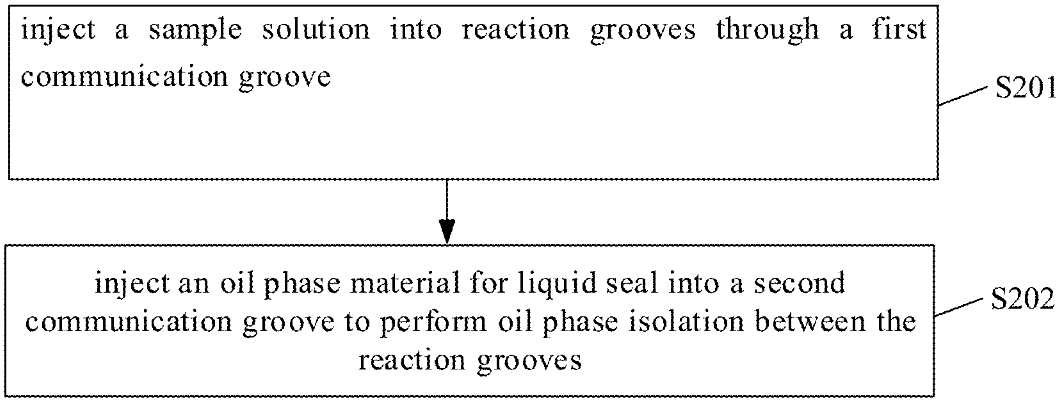
FIG. 14 is a flowchart of a sample introduction method for a detection chip according to an embodiment of the present disclosure.

FIG. 14 is a flowchart of a sample introduction method of a detection chip according to an embodiment of the disclosure. As shown in FIG. 14, the sample introduction method includes Steps S201 to S202.

Step S201 includes injecting a sample solution into the reaction grooves through the first communication groove.

Step S202 includes injecting an oil phase material for liquid seal into the second communication groove to perform oil phase isolation on each reaction groove.

In some embodiments, before the sample introduction, the first liquid inlet, the first liquid outlet, the second liquid inlet and the second liquid outlet may be closed tightly by rubber caps, so that the first liquid inlet, the first liquid outlet, the second liquid inlet and the second liquid outlet are all in a closed state. During the sample introduction, two metal needles are respectively pricked into the rubber caps at the first liquid inlet and the first liquid outlet, so that the first liquid inlet and the first liquid outlet are unsealed, then the pre-mixed sample solution is pressed into the first liquid inlet through the metal needle at the first liquid inlet (meanwhile, a certain negative pressure may be applied to the first liquid outlet), the sample solution flows in the first communication channel and fills the reaction grooves one by one, and the metal needles at the first liquid inlet and the first liquid outlet are taken out after the filling of all the reaction grooves is finished, so that the first liquid inlet and the first liquid outlet are in a closed state again. Then, two metal needles are respectively pricked into the rubber caps at the second liquid inlet and the second liquid outlet to unseal the second liquid inlet and the second liquid outlet, then the oil phase material for liquid seal is pressed into the second liquid inlet through the metal needle at the second liquid inlet (meanwhile, a certain negative pressure may be applied to the second liquid outlet), the oil phase material flows in the second communication channel, and cuts the sample solution in the first communication groove into two portions (the second portion in the first communication groove contains the oil phase material, and the first portion and the third portion in the first communication groove contain the sample solution), so that oil phase isolation is achieved between the reaction grooves, the injection of the oil phase material is stopped when no bubbles are pressed out from the second liquid outlet, and the sample introduction is completed.

In some embodiments, when the first substrate includes the heating electrode, the heating electrode may be further supplied with an electrical signal according to actual needs during the sample introduction process and during the PCR reaction after the sample introduction process, so as to adjust the temperature of the reaction chamber.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. A detection chip having at least one functional region, each functional region comprising: a reaction region and a non-reaction region surrounding the reaction region, wherein the detection chip comprises:

a first substrate and a second substrate opposite to each other;

a plurality of reaction grooves arranged in an array along a first direction and a second direction, on a side of the first substrate facing the second substrate in the reaction region;

first communication grooves, each of which is between two reaction grooves adjacent in the first direction and connected with the two reaction grooves, and extends along the first direction; and second communication grooves, each of which is between two first communication grooves adjacent in the second direction and connected with the two first communication grooves, and extends along the second direction, wherein the first direction intersects the second direction, wherein the first substrate comprises: a base substrate and a hole defining layer on a side of the base substrate facing the second substrate;

the hole defining layer has a first hole structure in a region where the first communication groove is to be formed, the first communication groove comprising the first hole structure;

the hole defining layer has a second hole structure in a region where the second communication groove is to be formed, the second communication groove comprising the second hole structure; and the hole defining layer has a third hole structure in a region where the reaction groove is to be formed, the reaction groove comprising the third hole structure, wherein the detection chip further comprises:

a heating electrode between the base substrate and the hole defining layer, the heating electrode being configured to heat the reaction groove; and a control electrode between the heating electrode and the base substrate, and a first insulating layer between the control electrode and the heating electrode, wherein the control electrode is connected to the heating electrode through a via hole in the first insulating layer, and the control electrode is configured to apply an electrical signal to the heating electrode, wherein detection chip further comprises a second insulating layer between the heating electrode and the hole defining layer, and a light shielding layer between the second insulating layer and the hole defining layer, wherein the light shielding layer has a hollow structure in a region where the reaction groove is to be formed, the reaction groove further comprising the hollow structure.

2. The detection chip of claim 1, wherein a width of the first communication groove is greater than a width of the second communication groove.

3. The detection chip of claim 2, wherein a depth of the reaction groove is greater than or equal to a depth of the second communication groove.

4. The detection chip of claim 3, wherein the first communication groove comprises: a first portion, a second portion and a third portion sequentially connected along the first direction, the first portion and the third portion being respectively connected with two adjacent reaction grooves, and the second portion being connected with the second communication groove;

a depth of the first portion and a depth of the third portion are both greater than or equal to the depth of the second communication groove; and a depth of the second portion is equal to the depth of the second communication groove.

5. The detection chip of claim 1, further comprising a first liquid inlet and a first liquid outlet penetrating the second substrate and in the non-reaction region, wherein the reaction grooves and the first communication grooves alternately arranged in the first direction constitute a first communication channel, and two ends of the first communication channel are respectively communicated with the first liquid inlet and the first liquid outlet, the first liquid inlet and the first liquid outlet are respectively on opposite sides of the reaction region in the first direction, and a line connecting a center of the first liquid inlet and a center of the first liquid outlet extends in the first direction and passes through a center of the reaction region.

6. The detection chip of claim 5, further comprising a first inlet connection groove and a first outlet connection groove corresponding to the first communication channel on the side of the first substrate facing the second substrate, wherein one end of the first inlet connection groove is connected with one end of a corresponding first communication channel, and the other end of the first inlet connection groove extends to the non-reaction region and is connected with the first liquid inlet; and one end of the first outlet connection groove is connected with the other end of the corresponding first communication channel, and the other end of the first outlet connection groove extends to the non-reaction region and is connected with the first liquid outlet.

7. The detection chip of claim 6, further comprising a second liquid inlet and a second liquid outlet penetrating through the second substrate in the second substrate and in the non-reaction region, wherein the second communication grooves arranged in the second direction constitute a second communication channel, and two ends of the second communication channel are respectively communicated with the second liquid inlet and the second liquid outlet, the second liquid inlet and the second liquid outlet are respectively on opposite sides of the reaction region in the second direction, and a line connecting a center of the second liquid inlet and a center of the second liquid outlet extends in the second direction and passes through the center of the reaction region.

8. The detection chip of claim 7, further comprising a second inlet connection groove and a second outlet connection groove corresponding to the second communication channel on the side of the first substrate facing the second substrate, wherein one end of the second inlet connection groove is connected with one end of a corresponding second communication channel, and the other end of the second inlet connection groove extends to the non-reaction region and is connected with the second liquid inlet;

one end of the second outlet connection groove is connected with the other end of the corresponding second communication channel, and the other end of the second outlet connection groove extends to the non-reaction region and is connected with the second liquid outlet;

a width of the first communication groove ranges from 20 μm to 30 μm; and a width of the second communication groove ranges from 10 μm to 20 μm.

9. The detection chip of claim 1, further comprising a first inlet connection groove, a first outlet connection groove, a second inlet connection groove and a second outlet connection groove on the side of the first substrate facing the second substrate, wherein the hole defining layer has a fourth hole structure in a region where the first inlet connection groove is to be formed and a fifth hole structure in a region where the first outlet connection groove is to be formed, the first inlet connection groove comprising the fourth hole structure, and the first outlet connection groove comprising the fifth hole structure, and wherein the hole defining layer has a sixth hole structure in a region where the second inlet connection groove is to be formed and a seventh hole structure in a region where the second outlet connection groove is to be formed, the second inlet connection groove comprising the sixth hole structure, and the second outlet connection groove comprising the seventh hole structure.

10. The detection chip of claim 1, further comprising a first accommodation groove on a side of the base substrate facing the hole defining layer in a region where the reaction groove is to be formed, the reaction groove further comprising the first accommodation groove, wherein the first communication groove comprises: a first portion, a second portion and a third portion sequentially connected along the first direction, the first portion and the third portion being respectively connected with two adjacent reaction grooves, and the second portion being connected with the second communication groove;

the base substrate has a second accommodation groove in a region where the first portion is to be formed, and a third accommodation groove in a region where the third portion is to be formed, the second accommodation groove and the third accommodation groove being both connected with a corresponding first accommodation groove; and the first communication groove further comprises the second accommodation groove and the third accommodation groove.

11. The detection chip of claim 10, wherein the second substrate comprises: a cover plate and a heating electrode on a side of the cover plate facing the first substrate, and the heating electrode is configured to heat the reaction groove, wherein the detection chip further comprises a first protection layer on a side of the heating electrode facing away from the cover plate.

12. The detection chip of claim 11, further comprising a control electrode between the heating electrode and the cover plate, and a first insulating layer between the control electrode and the heating electrode, wherein the control electrode is connected with the heating electrode through a via hole in the first insulating layer, and the control electrode is configured to apply an electrical signal to the heating electrode.

13. The detection chip of claim 1, wherein a material of the hole defining layer comprises: a photoresist, and a number of the at least one functional region is plural.

14. The detection chip of claim 1, further comprising a hydrophilic layer on a bottom of the reaction groove, a sidewall of the reaction groove, a bottom of the first communication groove, and/or a sidewall of the first communication groove; and a hydrophobic layer on a bottom of the second communication groove and/or a sidewall of the second communication groove.

15. A method for fabricating a detection chip, the detection chip being the detection chip of claim 1, which has at least one functional region, the functional region comprising: a reaction region and a non-reaction region surrounding the reaction region, wherein the method comprises:

fabricating a first substrate and a second substrate respectively;

forming a plurality of reaction grooves arranged in an array along a first direction and a second direction on a side of the first substrate;

forming first communication grooves, each of which is between two reaction grooves adjacent in the first direction and connected with the two reaction grooves, and extends along the first direction;

forming second communication grooves, each which is between two first communication grooves adjacent in the second direction and connected with the two first communication grooves, and extends along the second direction, wherein the first direction intersects the second direction;

arranging a side of the first substrate provided with the plurality of reaction grooves, the first communication grooves and the second communication grooves, to be opposite to the second substrate; and encapsulating the first substrate and the second substrate.

16. A sample introduction method for a detection chip, the detection chip being the detection chip of claim 1, the sample introduction method comprising:

injecting a sample solution into the plurality of reaction grooves through the first communication grooves; and injecting an oil phase material into the second communication grooves to isolate the sample solution in the reaction grooves by using the oil phase material.

17. A detection chip having at least one functional region, each functional region comprising: a reaction region and a non-reaction region surrounding the reaction region, wherein the detection chip comprises:

a first substrate and a second substrate opposite to each other;

a plurality of reaction grooves arranged in an array along a first direction and a second direction, on a side of the first substrate facing the second substrate in the reaction region;

first communication grooves, each of which is between two reaction grooves adjacent in the first direction and connected with the two reaction grooves, and extends along the first direction; and second communication grooves, each of which is between two first communication grooves adjacent in the second direction and connected with the two first communication grooves, and extends along the second direction, wherein the first direction intersects the second direction, wherein the first substrate comprises: a base substrate and a hole defining layer on a side of the base substrate facing the second substrate;

the hole defining layer has a first hole structure in a region where the first communication groove is to be formed, the first communication groove comprising the first hole structure;

the hole defining layer has a second hole structure in a region where the second communication groove is to be formed, the second communication groove comprising the second hole structure; and the hole defining layer has a third hole structure in a region where the reaction groove is to be formed, the reaction groove comprising the third hole structure, wherein the detection chip further comprises a first accommodation groove on a side of the base substrate facing the hole defining layer in a region where the reaction groove is to be formed, the reaction groove further comprising the first accommodation groove, wherein the first communication groove comprises: a first portion, a second portion and a third portion sequentially connected along the first direction, the first portion and the third portion being respectively connected with two adjacent reaction grooves, and the second portion being connected with the second communication groove;

the base substrate has a second accommodation groove in a region where the first portion is to be formed, and a third accommodation groove in a region where the third portion is to be formed, the second accommodation groove and the third accommodation groove being both connected with a corresponding first accommodation groove; and the first communication groove further comprises the second accommodation groove and the third accommodation groove, the detection chip further comprises a light shielding layer between the base substrate and the hole defining layer, wherein the light shielding layer has a hollow structure in a region where the reaction groove is to be formed, the reaction groove further comprising the hollow structure.

* * * * *